United States Patent [19]

Bateman

[11] Patent Number: 5,225,829
[45] Date of Patent: Jul. 6, 1993

[54] INDEPENDENT LOW AIRSPEED ALERT

[75] Inventor: Charles D. Bateman, Bellevue, Wash.

[73] Assignee: Sundstrand Corporation, Rockford, Ill.

[21] Appl. No.: 697,831

[22] Filed: May 9, 1991

[51] Int. Cl.⁵ ............................................. G08B 23/00
[52] U.S. Cl. ..................................... 340/967; 244/181; 340/970; 340/969; 364/435
[58] Field of Search ............... 340/963, 966, 967, 968, 340/969, 970; 244/181; 73/178 T; 364/433, 435

[56] References Cited

U.S. PATENT DOCUMENTS

| | | |
|---|---|---|
| 3,686,936 | 8/1972 | Daudt, Jr. ........................... 340/966 |
| 3,735,340 | 5/1973 | Donnelly et al. ................... 340/966 |
| 3,946,358 | 3/1976 | Bateman . |
| 4,027,839 | 6/1977 | Quinlivan ........................... 340/966 |
| 4,044,975 | 8/1977 | Blechen et al. ..................... 364/435 |
| 4,230,290 | 10/1980 | Townsend et al. ................. 340/967 |
| 4,586,140 | 4/1986 | Millen ................................. 340/968 |
| 4,590,475 | 5/1986 | Brown ................................. 340/966 |
| 4,725,811 | 2/1988 | Muller et al. . |
| 4,908,619 | 3/1990 | Bala et al. ........................... 340/967 |
| 5,119,091 | 6/1992 | Zweifel ............................... 340/963 |

FOREIGN PATENT DOCUMENTS 8704991  8/1987  World Int. Prop. O. .......... 340/963

Primary Examiner—Jin F. Ng
Assistant Examiner—Brent A. Swarthout
Attorney, Agent, or Firm—Fitch, Even, Tabin & Flannery

[57] ABSTRACT

A low airspeed alerting system for alerting the pilot of an aircraft of insufficient airspeed during a landing monitors various readily available signals representative of flight parameters of an aircraft such as pitch angle, vertical speed and true airspeed and advises the pilot when the airspeed of the aircraft is approaching an airspeed (kinetic energy) that is too low with respect to the ground to maintain the aircraft flying along the desired flight path without stalling, or without action by the pilot in time to recover.

21 Claims, 1 Drawing Sheet

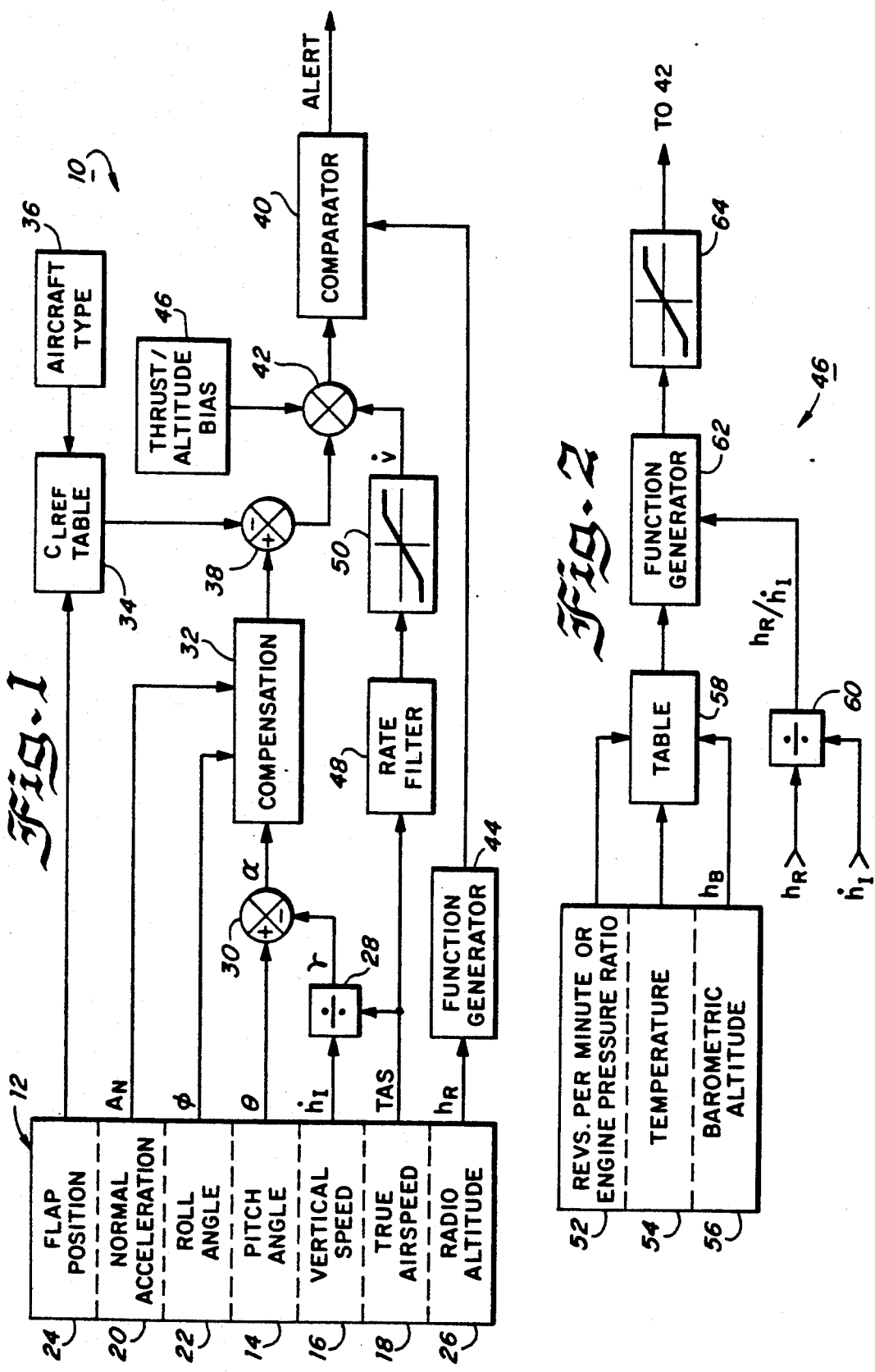

INDEPENDENT LOW AIRSPEED ALERT

BACKGROUND OF THE INVENTION

1. Field of the Invention

This invention relates generally to warning systems for aircraft that alert the pilot of an aircraft of a hazardous flight condition in order to enable the pilot to take appropriate corrective action. More particularly, the present invention relates to a warning system that monitors various flight parameters of the aircraft, particularly during an approach to a landing, and advises the pilot when the airspeed of the aircraft (kinetic energy), and the energy being generated (thrust) is too low to maintain the desired flight path.

2. Description of the Prior Art

Various systems for warning the pilot of a hazardous flight condition are known. Such systems generally monitor various flight parameters of an aircraft and generate a warning if the descent rate or the closure rate of the aircraft is excessive, if there is insufficient terrain clearance, if the altitude loss after take-off is excessive and if the aircraft is below the glideslope. An example of such a system is disclosed in U.S. Pat. No. 3,946,358.

While the prior art warning systems provide warnings upon the occurrence of various hazardous flight conditions, it is also desirable to provide a warning of a low airspeed condition, particularly for automated aircraft where engine thrust is automatically controlled by a computer aboard the aircraft. Such a low airspeed warning system is particularly useful during an approach to a landing where the engines may be throttled back and the desired flight path maintained by adjusting the angle of attack of the aircraft. Under such conditions, the aircraft could lose airspeed without the pilot realizing it since the aircraft is under computer control until the airspeed is insufficient to permit the aircraft to fly.

SUMMARY

Accordingly, it is an object of the present invention to provide an alerting system that alerts the pilot of an aircraft of a low airspeed condition.

It is another object of the present invention to provide a low airspeed alerting system that utilizes flight parameter representative signals that are readily available aboard modern aircraft.

In accordance with a preferred embodiment of the invention, the system according to the invention monitors the angle of attack of the aircraft, or a lift coefficient of the aircraft computed from the angle of attack, and compares it with a reference lift coefficient for the particular aircraft being flown. Because the lift provided by the wing of an aircraft is a function of lift coefficient and airspeed, and because the lift coefficient is a function of the angle of attack, a relatively high angle of attack or lift coefficient indicates a relatively low airspeed. Thus, if the angle of attack or lift coefficient exceeds a predetermined value, a low airspeed indication is generated. The system may also be compensated to account for the normal acceleration and roll angle of the aircraft, rates of change of airspeed, and to account for the time required for the engines of the aircraft to respond to a throttle input.

BRIEF DESCRIPTION OF THE DRAWING

These and other objects and advantages of the present invention will become readily apparent upon consideration of the following detailed description and attached drawing, wherein:

FIG. 1 is a functional block diagram of the low speed alerting system according to the invention; and FIG. 2 is a functional block diagram of the thrust/altitude biasing circuit of FIG. 1.

DETAILED DESCRIPTION OF THE PREFERRED EMBODIMENT

Referring now to the drawing, with particular attention to FIG. 1, there is shown a low airspeed alert system according to the invention generally designated by the reference numeral 10. The low speed alert system 10 receives signals from an aircraft signal source 12 that contains signals sources for providing signals representative of pitch angle 14, vertical speed 16, true airspeed 18, normal acceleration 20, roll angle 22, flap position 24 and radio altitude 26. These signals are commonly available on modern aircraft and may be obtained from individual instruments or from a common data bus on newer aircraft.

The system according to the invention utilizes a divider 28 and a summing junction 30 to generate a signal representative of the angle of attack, $\alpha$, aircraft and a compensation circuit 32 to compensate the angle of attack signal, $\alpha$, for normal acceleration, $A_N$, and roll angle, $\phi$. A look-up table 34 stores the reference coefficient of lift utilized during an approach to a landing by various aircraft. The compensation circuit 32 may also contain computation circuitry to enable it to generate a computed coefficient of lift for the aircraft based on the aircraft type and the angle of attack, roll angle and normal acceleration inputs. An aircraft type selector 36 selects the appropriate coefficient of lift from the coefficient of lift reference table 34 based on the type of aircraft being flown. A summing junction 38 compares the compensated angle of attack signal or computed lift coefficient with the coefficient of lift reference signal, $C_{LREF}$, to provide a signal representative of the compensated angle of attack or computed lift coefficient relative to the reference coefficient of lift. The difference signal from the summing junction 38 is applied to a comparator 40 via a summing junction 42 where it is compared with a coefficient of lift signal received from a function generator 44. The comparator 40 issues an alert in the event that the computed coefficient of lift or the angle of attack required to achieve the coefficient of lift provided by the function generator 44 exceeds a predetermined amount. The angle of attack or computed coefficient of lift signal is biased by a thrust/altitude signal source 46 that biases the signal as a function of the time required for the engine of the aircraft to attain full thrust. In addition, the angle of attack or computed coefficient of lift signal is also biased as a function of the rate of change of airspeed or true airspeed obtained from a rate filter 48 and a limiter 50.

Certain automated aircraft, such as the A320 Airbus have automated control systems that control engine thrust and the attitude of the aircraft to maintain a desired flight path during an approach to a landing. In such aircraft, the pilot uses a control stick that serves as an input to an on board computer to select the desired flight path and the computer determines the engine thrust and angle of attack of the aircraft to maintain the desired flight path. Should the lift produced by the wings of the aircraft be insufficient to maintain the desired flight path, the computer may either increase the thrust of the engines to increase the airspeed to obtain the desired lift, or increase the angle of attack of the aircraft to increase lift. Typically, both thrust and angle of attack are controlled to maintain the desired flight path angle. A stall protection mode wherein the angle of attack of the aircraft is reduced if a stall is imminent is also incorporated in such automated systems.

While such automated control systems generally work satisfactorily, there have been incidents where an aircraft has landed short of the runway or has been unable to recover from a missed approach because the airspeed of the aircraft dropped below a safe level and went unnoticed by the pilot. Under such circumstances, the engines were idling and the desired flight path was maintained by adjusting the angle of attack. However, the increase in angle of attack required to provide the desired lift resulted in a reduction in the airspeed of the aircraft that went unnoticed by the pilot. Eventually, the airspeed dropped enough so that the automatic stall prevention system lowered the nose of the aircraft with insufficient thrust and altitude remaining to maintain the desired flight path.

The system according to the invention utilizes the divider 28 to divide the vertical speed signal from the vertical speed signal source 16 by the true airspeed from the true airspeed source 18. The vertical speed signal may be a barometric rate signal or an inertially derived vertical velocity signal such as the signal $h_f$ illustrated in FIG. 2. By dividing the vertical velocity signal by the true airspeed, a signal representative of flight path angle is generated. The flight path angle is subtracted from the pitch angle $\Theta$ from the pitch angle signal source 14 to provide a semi-inertial angle of attack signal $\alpha$. The relationships between various angles of acceleration encountered by an aircraft in flight are disclosed in U.S. Pat. No. 4,725,811, incorporated herein by reference.

The angle of attack signal $\alpha$ is termed a semi-inertial angle of attack because the pitch angle is inertially derived, for example, from a vertical gyroscope or inertial reference system, while the true airspeed is an air mass derived signal. The vertical velocity may be either an air mass derived signal if barometric rate is used or an inertially derived signal if it is derived from the inertial navigation system. The semi-inertial angle of attack signal $\alpha$ is compensated for the effects of maneuvering by the normal acceleration signal $A_N$ from the normal acceleration signal source 20, which may be a normal accelerometer, and by the roll angle signal $\phi$ from the roll angle signal source 22 which may be a gyroscope.

During an approach to a landing, it is desirable to maintain a predetermined coefficient of lift $C_{LREF}$. The value of the coefficient of lift $C_{LREF}$ is determined by the type of aircraft and the position of the flaps. Such a reference coefficient of lift may be stored in the look-up table 34, and the appropriate coefficient of lift accessed by a signal from an aircraft type identifier 36 that defines the type of aircraft so that the appropriate coefficient of lift for that aircraft may be selected from the $C_{LREF}$ table 34. In addition, a flap position input from the flap position source 24 is applied to the $C_{LREF}$ table 34 so that the appropriate coefficient of lift when the aircraft flaps are in the landing position may be selected.

The coefficient of lift is a dimensionless quantity that increases substantially linearly as a function of the angle of attack of the wing until the angle of attack increases to a value at which the wing stalls out and the coefficient of lift drops rapidly.

The amount of lift generated by the wing of an aircraft is a function of the coefficient of lift and the airspeed of the aircraft, i.e., the greater the airspeed, the greater the lift. The reference coefficient of lift $C_{LREF}$ is determined for a particular aircraft based on the geometry of its wing, its normal angle of attack during an approach to a landing and the landing airspeed of the aircraft. Thus, if the reference of coefficient of lift $C_{LREF}$ is known, the airspeed may be inferred by monitoring the angle of attack. The monitoring of the angle of attack is accomplished by the summing junction 38 which compares the angle of attack signal, as compensated by the compensation circuit 32 with the reference lift coefficient and applies the result of the comparison to the comparator 40 via the summing junction 42. The comparator 40 compares the output of the summing junction 42 with a coefficient of lift that is a function of altitude. For example, at 100 feet of radio altitude and above, the output of the function generator may be equal to the reference coefficient of lift $C_{LREF}$. Below 100 feet, the coefficient of lift generated by the function generator 44 gradually increases until it is equal to the coefficient of lift for a speed equal to 1.08 times the stall speed at a radio altitude of 20 feet. At zero feet, the alert may be turned off. Thus, should the actual coefficient of lift of the aircraft, as evidenced by the angle of attack, be excessive indicating a too low airspeed, the comparator 40 will issue an alert. The alert signal from the comparator 40 may be used to operate a voice generator that could generate a message such as "TOO LOW", "LOW AIRSPEED", "AIRSPEED TOO LOW" or "SPEED", etc.

The angle of attack signal from the compensation circuit 32 can be biased to compensate for the effects of acceleration of the aircraft. This is accomplished by differentiating the true airspeed (or airspeed) of the aircraft by a high-pass rate filter 48 to obtain an airspeed acceleration signal $\dot{v}$. This signal is limited by the limiter 50 to limit the maximum amount of acceleration bias that can be provided. The limited airspeed acceleration signal $\dot{v}$ from the limiter 50 is applied to the summing junction 42 to permit a higher angle of attack or computed coefficient of lift if the aircraft is accelerating and to generate the warning sooner if the aircraft is decelerating.

The angle of attack signal from the summing junction 30 is compensated for the roll angle of the aircraft and any normal acceleration of the aircraft. This is because the roll angle of the aircraft affects the coefficient of lift, and consequently, the angle of attack required to determine the desired coefficient of lift varies as a function of roll angle. Also, the angle of attack is varied as a function of normal acceleration, since a negative normal acceleration indicates that the aircraft is descending and under such circumstances, the angle of attack signal should be biased to provide a warning sooner.

In addition, the angle of attack or coefficient of lift signal from the summing junction 38 is biased as a function of the thrust of the engine and barometric altitude to generate the warning sooner in the event that the engines are throttled back, particularly at high barometric altitudes. The biasing is provided by the thrust/altitude biasing circuit 46 illustrated in FIG. 2.

In a jet engine, the amount of time required for the engine to develop full thrust varies as a function of the RPM of the engine and the density of the air in which the engine is operating. Depending on the engine and on ambient conditions, the amount of time required for the engine to achieve full thrust can be on the order of 7 to 9 seconds. Thus, it is desirable to bias the angle of attack or computed coefficient of lift signal from the summing junction 38 to compensate for the amount of time required for the engine to obtain full thrust. The compensation is provided by the circuit 46 (FIG. 2) that utilizes a source of signals 52 that provides an indication of the thrust level of the engine by measuring engine RPM or the engine pressure ratio, an ambient air temperature signal 54, and a barometric altimeter signal. These signals are applied to, for example, a look-up table 58 that provides an output representative of the amount of time necessary for the engine to reach full thrust based on the present engine thrust, ambient temperature and barometric altitude.

The time to impact of the aircraft is calculated by the divider 60 by dividing the radio altitude by the vertical velocity of the aircraft to determine the time to impact. The time to impact and the response time of the engine are applied to a function generator 62 which biases the angle of attack or computed lift coefficient signal from the summing junction 38. A limiter 64 would serve to limit the amount of bias to, for example, 3° of angle of attack or the equivalent in lift coefficient.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A low airspeed warning system for warning the pilot of an aircraft of a low airspeed condition wherein the current flight path angle cannot be maintained, comprising:
   means for monitoring a signal representative of the angle of attack of the aircraft;
   means for providing a signal representative of a reference coefficient of lift required by the aircraft during an approach to a landing phase of flight; and
   means for comparing said coefficient of lift representative signal with said angle of attack representative signal and providing a signal representative of said low airspeed condition prior to the onset of an imminent stall condition if the difference between the compared signals exceeds a predetermined amount as determined by the altitude above ground at which the aircraft is flying.

2. A low airspeed warning system as recited in claim 1, wherein said system includes means for providing a signal representative of the angle of attack of the aircraft, said angle of attack signal providing means including means for receiving signals representative of the pitch angle of the aircraft and the flight path angle of the aircraft and providing a signal representative of the difference therebetween, said difference representative signal being representative of the angle of attack of the aircraft.

3. A low airspeed warning system as recited in claim 2, wherein said system includes means for providing said flight path angle representative signal, said angle of attack signal providing means including means for receiving a signal representative of the vertical velocity of the aircraft, means for receiving a signal representative of the airspeed of the aircraft and means for dividing the vertical velocity representative signal by the airspeed representative signal to provide the flight path angle signal.

4. A low airspeed warning system as recited in claim 1 further including means for receiving a signal representative of the normal acceleration of the aircraft and means responsive to said normal acceleration signal for altering said angle of attack signal as a function of the normal acceleration of the aircraft.

5. A low airspeed warning system as recited in claim 1 further including means for receiving a signal representative of the roll angle of the aircraft and means responsive to said roll angle signal for altering said angle of attack signal as a function of the roll angle of the aircraft.

6. A low airspeed warning system as recited in claim 1 further including means for receiving a signal representative of the engine thrust of the aircraft and means responsive to said engine thrust signal for altering said angle of attack signal as a function of the engine thrust of the aircraft.

7. A low airspeed warning system as recited in claim 6 further including means for receiving a signal representative of the barometric altitude of the aircraft and means responsive to said barometric altitude signal for altering said angle of attack signal as a function of the altitude of the aircraft.

8. A low airspeed warning system as recited in claim 7 further including means for receiving a signal representative of the temperature of the air surrounding the aircraft and means responsive to said temperature signal for altering said angle of attack signal as a function of the temperature signal.

9. A low airspeed warning system as recited in claim 1 further including means for receiving a signal representative of the rate of change of airspeed of the aircraft and means responsive to said rate of change of airspeed signal for altering said angle of attack signal as a function of the rate of change of airspeed of the aircraft.

10. A low airspeed warning system for warning the pilot of an aircraft of a low airspeed condition wherein the current flight path angle cannot be maintained, comprising:
    means for monitoring a signal representative of a computed coefficient of lift of the aircraft;
    means for providing a signal representative of a reference coefficient of lift required by the aircraft during an approach to a landing phase of flight; and
    means for comparing said reference coefficient of lift representative signal with said computed coefficient of lift representative signal and providing a signal representative of said low airspeed condition prior to the onset of an imminent stall condition if the difference between the compared signals exceeds a predetermined amount as determined by the altitude above ground at which the aircraft is flying.

11. A low airspeed warning system as recited in claim 10, wherein said system includes means for providing a signal representative of the computed coefficient of lift, said computed coefficient of lift signal providing means including means for receiving signals representative of the pitch angle of the aircraft and the flight path angle of the aircraft and providing a signal representative of the difference therebetween, said difference representative signal being representative of the computed coefficient of lift of the aircraft.

12. A low airspeed warning system as recited in claim 11, wherein said system includes means for providing said flight path angle representative signal, said computed coefficient of lift signal providing means including means for receiving a signal representative of the vertical velocity of the aircraft, means for receiving a signal representative of the airspeed of the aircraft and means for dividing the vertical velocity representative signal by the airspeed representative signal to provide the flight path angle signal.

13. A low airspeed warning system as recited in claim 10 further including means for receiving a signal representative of the normal acceleration of the aircraft and means responsive to said normal acceleration signal for altering said computed coefficient of lift signal as a function of the normal acceleration of the aircraft.

14. A low airspeed warning system as recited in claim 10 further including means for receiving a signal representative of the roll angle of the aircraft and means responsive to said roll angle signal for altering said computed coefficient of lift signal as a function of the roll angle of the aircraft.

15. A low airspeed warning system as recited in claim 10 further including means for receiving a signal representative of the engine thrust of the aircraft and means responsive to said engine thrust signal for altering said computed coefficient of lift signal as a function of the engine thrust of the aircraft.

16. A low airspeed warning system as recited in claim 15 further including means for receiving a signal representative of the barometric altitude of the aircraft and means responsive to said barometric altitude signal for altering said angle of attack signal as a function of the altitude of the aircraft.

17. A low airspeed warning system as recited in claim 16 further including means for receiving a signal representative of the temperature of the air surrounding the aircraft and means responsive to said temperature signal for altering said computed coefficient of lift signal as a function of the temperature signal.

18. A low airspeed warning system as recited in claim 10 further including means for receiving a signal representative of the rate of change of airspeed of the aircraft and means responsive to said rate of change of airspeed signal for altering said computed coefficient of lift signal as a function of the rate of change of airspeed of the aircraft.

19. A low airspeed warning method for warning the pilot of an aircraft of a low airspeed condition insufficient to maintain a predetermined flight path angle, comprising:

monitoring a signal representative of the angle of attack of the aircraft;

providing a signal representative of a reference coefficient of lift required by the aircraft during an approach to a landing phase of flight; and comparing said reference coefficient of lift representative signal with the angle of attack representative signal and providing a signal representative of said low airspeed condition prior to the onset of an imminent stall condition if the difference between the compared signals exceeds a predetermined amount as determined by the altitude above ground at which the aircraft is flying.

20. A low airspeed warning method for warning the pilot of an aircraft of a low airspeed condition insufficient to maintain a predetermined flight path angle, comprising:

monitoring a signal representative of the current coefficient of lift of the aircraft;

providing a signal representative of a reference coefficient of lift required by the aircraft during an approach to a landing phase of flight; and comparing said reference coefficient of lift representative signal with said current coefficient of lift representative signal and providing a signal representative of said low airspeed condition prior to the onset of an imminent stall condition if the difference between the compared signals exceeds a predetermined amount as determined by the altitude above ground at which the aircraft is flying.

21. A low airspeed warning system for warning the pilot of an aircraft of a low airspeed condition wherein the current flight path angle cannot be maintained, comprising:

means for monitoring a signal representative of a computed coefficient of lift of the aircraft;

means for providing a signal representative of a reference coefficient of lift required by the aircraft during an approach to a landing phase of flight; and means for comparing said reference coefficient of lift representative signal with said computed coefficient of lift representative signal and providing a signal representative of said low airspeed condition prior to the onset of an imminent stall condition if the difference between the compared signals exceeds a predetermined amount as determined by the altitude above ground at which the aircraft is flying.

* * * * *